(No Model.)

E. J. NICHOLS.
STOCK SALTER.

No. 368,161. Patented Aug. 9, 1887.

Witnesses.
C. W. Graham.
H. S. Brink.

Inventor.
Edward J. Nichols
By Wilson Greene,
Attorneys

UNITED STATES PATENT OFFICE.

EDWARD J. NICHOLS, OF FREEPORT, ILLINOIS, ASSIGNOR TO JOHN W. HENNEY, OF SAME PLACE.

STOCK-SALTER.

SPECIFICATION forming part of Letters Patent No. 368,161, dated August 9, 1887.

Application filed November 16, 1886. Serial No. 219,010. (No model.)

*To all whom it may concern:*

Be it known that I, EDWARD J. NICHOLS, a resident of Freeport, in the county of Stephenson and State of Illinois, have invented certain new and useful Improvements in Stock-Salters; and I do hereby declare the following to be a full, clear, and exact description of the invention, such as will enable others skilled in the art to which it pertains to make and use the same.

The objects of my improvements are to protect a large body of salt from the weather and from direct access of animals while allowing them to obtain a sufficient quantity quickly, and to prevent the body of salt from becoming impacted or caked.

The invention is fully described and explained in this specification, and shown in the accompanying drawings, in which—

Figure 1:
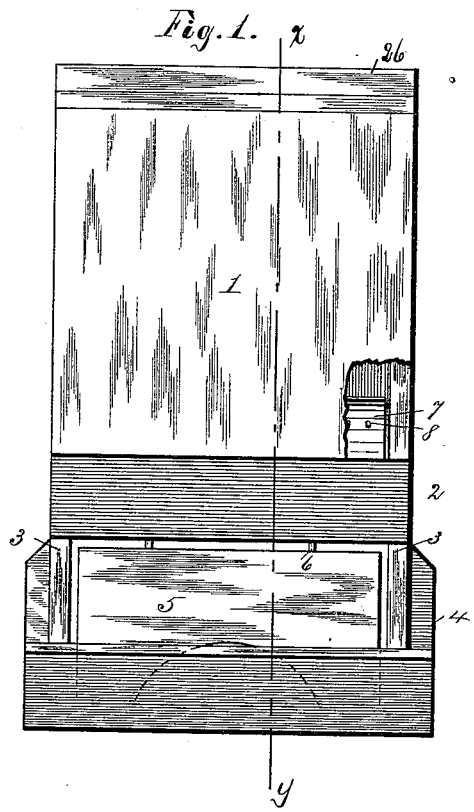
Figure 2:
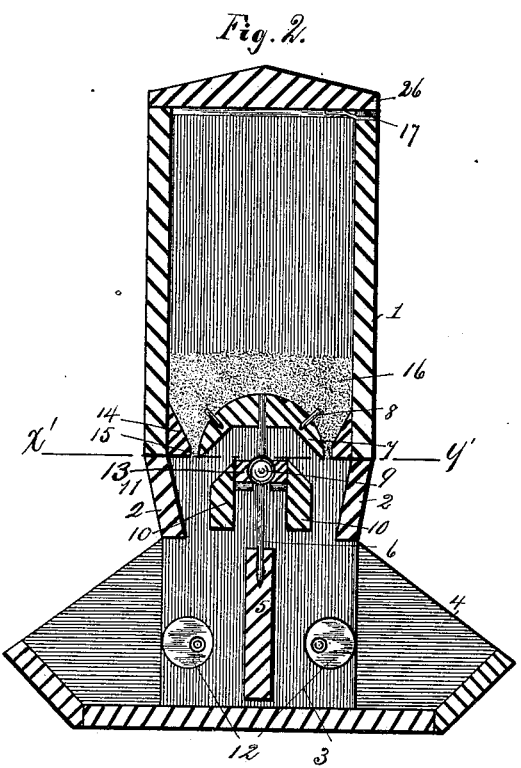
Figure 3:
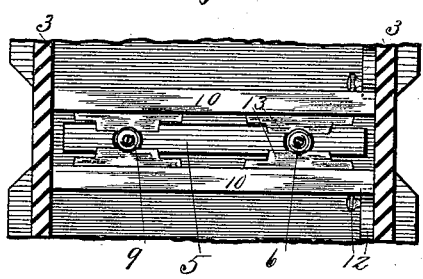

Figure 1 is an elevation of the salter, a part of the front being broken away to show the parts within. Fig. 2 is a central transverse vertical section of the salter, the plane of section passing through the line $x\,y$, Fig. 1. Fig. 3 is a horizontal section through the line $x'\,y'$, Fig. 2.

In the figures, 1 is a rectangular box whose end walls extend downward into a shallow trough, 4, to which they are rigidly attached. The rectangular box is narrowed laterally at the bottom by inclined pieces 2, forming a continuation of its side walls. From end to end of this box, near its lower edge, extend parallel bars 10, rigidly secured to the walls 3. Vertical rods 6, suspended midway between the bars 10, support upon their upper ends a semi-cylindrical block, 7, which forms a support for the salt 16. The block 7 is preferably considerably narrower than the box 1, and a portion of the space remaining upon each side is partially filled by horizontal bars 14, also extending from end to end of the box and immovably fastened upon its walls. The lower ends of the rods 6 are fixed in and support a partition, 5. Balls 9 are rigidly secured upon the rods 6, between the partition 5 and the block 7. They are supported in bearings 13, Figs. 2 and 3, attached immovably to the bars 10. By this arrangement of parts the partition 5 may be readily swung back and forth upon an axis passing horizontally through the ball centers, causing the block 7 to move in a similar manner, but in an opposite direction. The axis of rotation is preferably not coincident with the axis of the cylindrical surface of the block, in order that different parts of that surface in passing vertically above the axis of rotation may be at different distances therefrom, and hence may at each vibration cause the body of superincumbent salt to rise and fall, and be thereby agitated and broken. This latter effect is aided by pins 8, fixed in the cylindrical surface of the block 7. The space between the edges of the block 7 and the bars 14 is just sufficient to allow the block to swing freely toward either side to any distance that would be desirable. The lower surface of the block 7 is preferably concave, giving sharp or thin edges 15, which are on a line normally with the innermost edges of the bars 14, but which rise alternately as the block swings back and forth. By the enlargement of the space between the block 7 and bar 14, when the edge 15 rises, salt is allowed to fall into the trough below, and should lumps or impacted portions lodge in this space they are crushed and forced downward by the descending edge 15 when the block swings in the opposite direction. The amount of salt thus discharged into the trough below depends upon the arc through which the edge 15 passes, and this in turn depends upon the amplitude of vibration of the partition 5, which may be limited as desired. It is regulated by means of disks 12, eccentrically mounted upon screws entering the end walls, 3, of the box upon each side of the partition 5.

The exact forms shown are not essential to the operation of my devices. For example, a rock-shaft or any other form of hinge may replace the ball-and-socket support illustrated, and the forms of the block 7 and disks 12 may be varied indefinitely and still embody my invention, so long as the former is mounted eccentrically upon a support above or below itself and the latter are secured upon the end walls in such manner as to be adjustable with reference to the partition 5.

From the foregoing description the operation of my device in use is evident, since animals in seeking to obtain salt from the trough must naturally cause more or less oscillation of the partition 5.

What I claim as new, and desire to secure by Letters Patent, is—

1. In a stock-salter, the combination of a suitable trough, a salt-receptacle supported above the trough, and a block forming the bottom of said receptacle and pivoted on a horizontal axis, said block when rocked on said axis being adapted to permit salt to pass its lateral edges alternately and escape from the receptacle to the trough.

2. The combination, with a suitable trough and a salt-receptacle supported above the trough, of a block forming the bottom of said receptacle and having an approximately cylindrical upper surface, said block being pivoted on a horizontal axis eccentric with reference to the cylindrical surface of the block, whereby the rocking of the block on its axis tends to displace and pulverize the salt above it.

3. The combination, in a stock-salter, of a trough, a receptacle for salt supported vertically over said trough, a rocking block forming the bottom of said receptacle, a vertical partition dividing said trough into two open portions and joined to said block by rigid rods provided with balls and oscillating with it about a common axis, and adjustable stops upon opposite sides of said partition adapted to limit its motion, substantially as shown and described.

4. The trough 4, the receptacle 1, the block 7, and partition 5, rigidly connected with the block and oscillating with it about a common axis, and the stops 12, all constructed, combined, and operating substantially as shown and described, and for the purpose set forth.

5. The combination of the trough 4 and receptacle 1, the block 7, partition 5, and rods 6, the bars 10, fastened to the walls of the receptacle, and the balls 9, rigidly mounted on the rods 6 and resting in suitable bearings in the bars 10, substantially as and for the purpose set forth.

In testimony whereof I have signed this specification in the presence of two subscribing witnesses.

EDWARD J. NICHOLS.

Witnesses:
C. W. GRAHAM,
J. A. CRAIN.